J. D. ROBERTSON.
HUB ATTACHING DEVICE.
APPLICATION FILED JULY 18, 1910.
1,005,072.
Patented Oct. 3, 1911.
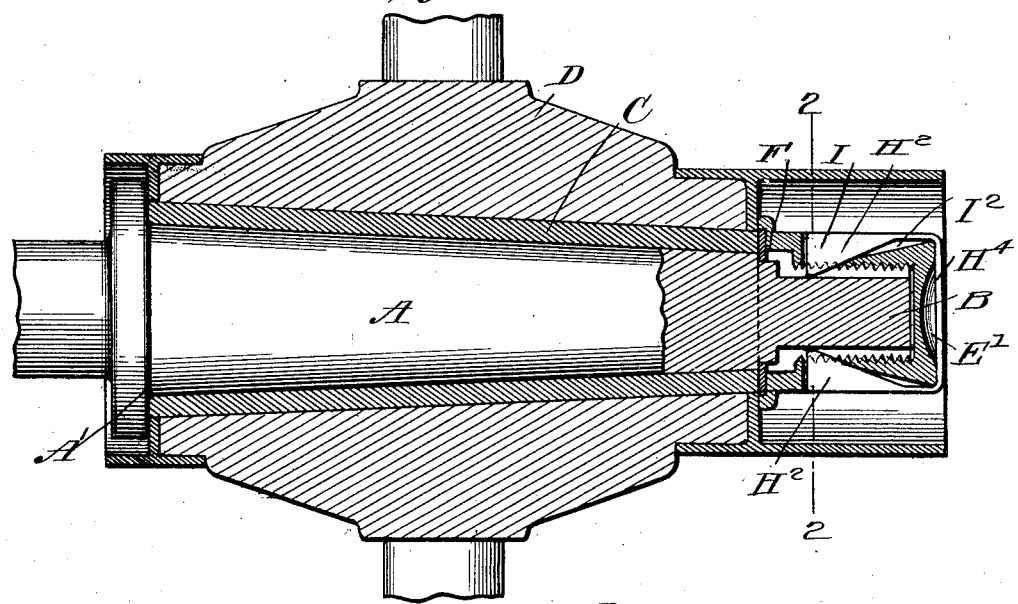
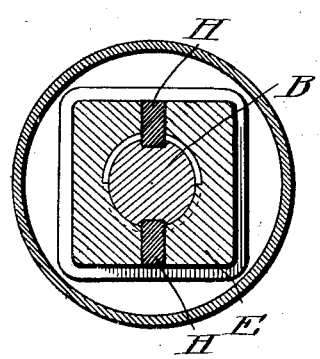
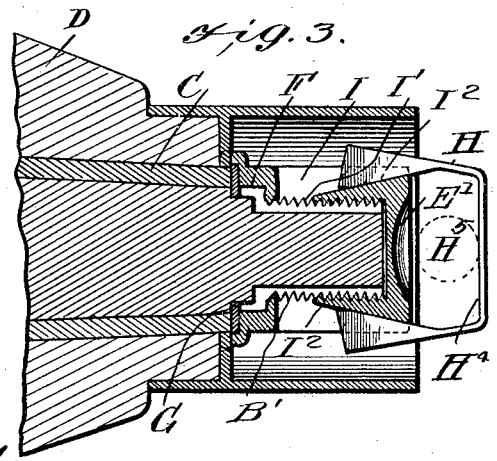
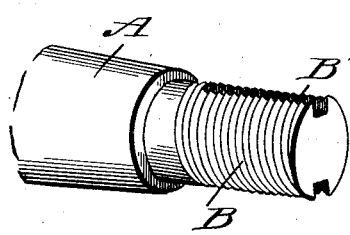
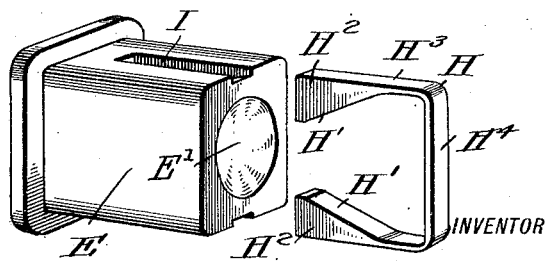
WITNESSES:
INVENTOR
JEFFERSON D. ROBERTSON
BY
ATTORNEYS

UNITED STATES PATENT OFFICE.

JEFFERSON D. ROBERTSON, OF LA PLATA, MARYLAND.

HUB-ATTACHING DEVICE.

1,005,072. Specification of Letters Patent. Patented Oct. 3, 1911.

Application filed July 18, 1910. Serial No. 572,468.

*To all whom it may concern:*

Be it known that I, JEFFERSON D. ROBERTSON, a citizen of the United States, and a resident of La Plata, in the county of Charles and State of Maryland, have invented certain new and useful Improvements in Hub-Attaching Devices, of which the following is a specification.

This invention is an improvement in hub attaching devices for use on vehicle wheels and the like and has for an object to provide a novel construction by which the wear on the ends of the box fitted upon the spindle may be easily taken up and by which the nut may be adjusted to take up this wear and may be locked in any desired adjustment upon the threaded tenon of the spindle and in which the locking devices for the nut may be released by moving the same longitudinally in the direction of the axis of the spindle.

The invention also includes a locking bail for the hub securing nut, which bail has a cross bar extending radially across the outer end of the nut in position to be grasped in pulling the bail to unlock the nut.

The invention consists in certain novel constructions and combinations of parts as will be hereinafter described and claimed.

In the drawing Figure 1 is a sectional view of my invention as in use. Fig. 2 is a cross section on about line 2—2 of Fig. 1. Fig. 3 is a detail section showing the locking bail in unlocked position. Fig. 4 is a perspective view showing a portion of the spindle, the nut, and the locking bail detached.

The spindle A has at its outer end a threaded tenon B which is grooved longitudinally at B' across its threads.

The box C within the hub D fits on the spindle A between the shoulder A' at the inner end of the spindle and the nut E which is screwed on the threaded tenon B and at its inner end the nut E is recessed at F to receive the end of the spindle and permit the adjustment of the nut back against the box C when the latter is worn in such manner as to take up the wear at the end or ends of the box. A washer or washers may be employed as shown at G.

The nut E is locked upon the threaded tenon B in order to secure it in any desired adjustment and this is accomplished by means of the locking bail H. To permit the operation of this bail H, the nut is slotted longitudinally at I in its opposite sides with the inner or rear end of said slots I opening at I' into the threaded bore of the nut and the base walls I² of said slots I in advance of the openings I' incline outwardly toward the outer end of the nut E for purposes presently described. I thus provide the nut in its opposite sides with slots I extending longitudinally of the nut and communicating at their inner ends through openings with the bore of the nut with the base walls of said slots in advance of such openings inclined outwardly toward the outer end of the nut. These walls I² form bearings upon which ride the inclined surfaces H' at the inner sides of lugs H² at the inner ends of the arms H³ of the locking bail, such arms H³ being connected at their outer ends by the cross bar H⁴ which extends across the outer end of the nut E in all positions of said bail and across the recess E' in the said outer end of the nut in the locked position of the bail, so that the said recess will afford means for permitting the operator to grasp the cross-bar H⁴ in order to pull the locking bail outwardly from the position shown in Fig. 1 to that shown in Fig. 3 in order to release the nut. Manifestly the locking bail H may be pulled entirely off the nut in releasing the same or any suitable form of peg such as indicated in dotted lines H⁵ in Fig. 3 may be inserted between the cross bar H⁴ and the end of the nut to hold the locking bail in unlocked position whenever desired.

In operation, when the parts are in the position shown in Fig. 1, the locking bail securely holds the nut from turning. If the box C wears at its ends and the wheel becomes loose upon the spindle, the locking bail may be released as shown in Fig. 3 to permit the nut to be turned farther on to take up the wear and the bail be again adjusted to locked position.

The operation of the bail is effected by a longitudinal movement thereof in the direction of the axis of the spindle, this operation, resulting in the lifting of the lugs H² out of the grooves B' of the threaded tenon by the action of the cam surfaces between said lugs and the nut, such cam surfaces being so disposed as to retain the lugs or projections of the locking bail in alinement with the openings I leading into the threaded bore of the nut so the re-adjustment of the locking bail to locked position is effected in a certain manner by simply pushing the said bail in upon the nut from the position shown in Fig. 3 to that shown in Fig. 1.

I claim:

1. An axle nut having a threaded bore and provided at its opposite sides with longitudinal slots whose inner ends communicate with the threaded bore of the nut and whose base walls between said point of communication and the outer end of the nut incline outwardly toward said end of the nut, the nut being provided in its outer end with a recess, and a locking bail having a cross bar extending across the outer end of the nut and overlying the said recess in the locked position of the bail and the arms of said bail being connected at their outer ends by said cross bar and having at their inner ends inwardly projecting lugs having inclined surfaces to ride upon the inclined walls of the nut slots, the said bail being movable in a direction parallel to the axis of the nut into and out of locked position, substantially as set forth.

2. An axle nut having a threaded bore to screw on the tenon of a spindle and having its inner end recessed to extend over the outer end of the spindle and provided with longitudinal slots whose inner ends communicate through openings with the threaded bore of the nut and a locking bail fitting on the outer end of the nut and having arms provided with projections operating in the slots of the nut, cam surfaces being provided whereby a longitudinal movement of the locking bail in the direction of the axis of the nut will adjust the same into and out of locked position, substantially as set forth.

3. An axle nut having a threaded bore and provided in its opposite sides with longitudinal slots opening at their inner ends into the bore of the nut and having their base walls in advance of said openings inclined outwardly toward the outer end of the nut and a locking bail having its arms provided with lugs sloped or inclined to coöperate with the inclined base walls of the slots, the said locking bail being movable in the direction of the axis of the nut into and out of locked position, substantially as set forth.

4. The combination of a grooved spindle tenon, a nut threaded thereon and having openings leading into its threaded bore and inclined walls leading from said openings toward the outer end of the nut and a locking bail embracing the outer end of the nut and movable in the direction of the axis of the nut into and out of locked position and having inwardly extending lugs or projections operating in the openings and upon the inclined walls of the nut, substantially as set forth.

JEFFERSON D. ROBERTSON.

Witnesses:
L. Albrittain,
L. M. Padgett.

---

Copies of this patent may be obtained for five cents each, by addressing the "Commissioner of Patents, Washington, D. C."